United States Patent
Smith

(10) Patent No.: US 11,543,012 B2
(45) Date of Patent: Jan. 3, 2023

(54) GEAR UNIT

(71) Applicant: Endurance Innovations LLC, Hawthorn Woods, IL (US)

(72) Inventor: David A. Smith, Hawthorn Woods, IL (US)

(73) Assignee: Endurance Innovations, LLC, Hawthorn Woods, IL (US)

(*) Notice: Subject to any disclaimer, the term of this patent is extended or adjusted under 35 U.S.C. 154(b) by 0 days.

(21) Appl. No.: 17/378,818

(22) Filed: Jul. 19, 2021

(65) Prior Publication Data

US 2022/0018429 A1    Jan. 20, 2022

Related U.S. Application Data

(60) Provisional application No. 63/053,814, filed on Jul. 20, 2020.

(51) Int. Cl.
  *F16H 55/06* (2006.01)
  *F16H 55/17* (2006.01)

(52) U.S. Cl.
  CPC .......... *F16H 55/17* (2013.01); *F16H 55/06* (2013.01)

(58) Field of Classification Search
  CPC ...... F16H 1/14; F16H 2055/173; F16H 55/20; F16H 55/17; F16H 55/06
  See application file for complete search history.

(56) References Cited

U.S. PATENT DOCUMENTS

| | | | | |
|---|---|---|---|---|
| 616,559 A | * | 12/1898 | Ramussen et al. | F16H 1/14 74/417 |
| 991,094 A | * | 5/1911 | Schneider | F16H 1/14 74/318 |
| 2,764,034 A | * | 9/1956 | Hotine | F16H 55/18 74/440 |
| 8,888,031 B2 | * | 11/2014 | Inoue | F16H 55/17 242/249 |
| 9,156,110 B2 | * | 10/2015 | Chen | B60K 17/165 |
| 10,577,069 B1 | * | 3/2020 | Lonsberry | B63H 20/20 |

FOREIGN PATENT DOCUMENTS

KR    101795401 B1  * 11/2017

OTHER PUBLICATIONS

Aircraft Materials, "Aircraft Steel AISI 9310 (ASM 6260 / AMS 6265 / AMS 6267", Jun. 10, 2016 (Year: 2016).*

* cited by examiner

*Primary Examiner* — William C Joyce
*Assistant Examiner* — Gregory Robert Weber
(74) *Attorney, Agent, or Firm* — Adam K. Sacharoff; Much Shelist, P.C.

(57) ABSTRACT

A gear unit includes a gear having a gear face and a plurality of gear teeth extending outwardly from the gear face. The gear unit also includes a hub integrally formed with the gear and arranged coaxially to the gear. The hub extends outwardly of the gear in a direction of a central axis of the gear. The gear unit also includes an undercut defined at an interface of the gear and the hub and includes a curved portion arranged at proximate to an inner end of the gear. The undercut reduces a stress concentration at the interface of the gear and the hub.

18 Claims, 3 Drawing Sheets

GEAR UNIT

CROSS-REFERENCE TO RELATED APPLICATION

This application is a non-provisional application claiming the benefit of priority to U.S. Provisional Application Ser. No. 63/053,814, titled "An improved design for a marine transmission drive unit", filed on Jul. 20, 2020, which is incorporated herein by reference in its entirety.

TECHNICAL FIELD

The present disclosure relates generally to a gear unit for a power train. More specifically, the present disclosure relates to a gear unit having a bevel gear and a hub integrally formed with the bevel gear for use in a cone-clutch gear assembly.

DESCRIPTION OF THE RELATED ART

Many recreational and marine work force boats utilize stern drive propulsion systems to generate locomotion. Specifically, many boats use cone-clutch drives, which implement an opposing pair of straight-cut bevel gears to translate forward rotation of an input shaft from an engine into both forward and reverse rotation of an output shaft, which may be connected to a propeller.

In operation, the speed of the engine and the drive must be modulated in different surface conditions, as the water produces resistance to the drive through the propeller(s). Calm surface conditions create somewhat stable resistance forces. However, choppy, or larger wave conditions create intermittent resistance forces, especially as boat speed increases.

Proper operation of a boat involves utilizing the throttle to increase power and speed while the drive is submerged, and reducing the throttle input if the drive is out of the water. For example, as a speed of the boat increases and the boat achieves plane, the propeller(s) can leave the water, which significantly reduces the resistance to the drive and causes the engine to "over-rev." The operator must then reduce throttle input and engine/propeller speed to more closely match the actual boat speed prior to the propeller(s) returning and reengaging with the water. In instances where the speed of the propeller(s) does not match the actual speed of the boat prior to reengaging the water, the load applied to the propeller creates a form of shock, which is ultimately transmitted from the propeller through the various components of the drive. This is a regular occurrence, and the modulation technique is preferably implemented regardless of engine horsepower, torque, or drive specification limits.

In addition to stresses imposed by intermittent engagement of the propeller with the water, stresses imposed on marine drive components may be magnified by increased engine performance. Marine stern drive units provided by Original Equipment Manufacturers (OEM) are generally designed according to the horsepower and torque outputs of an associated OEM engine. However, as boat engines are tuned and modified by third parties to maximize performance, the stresses imposed on the components of the drive may exceed the original design parameters. Accordingly, the aforementioned stresses introduced by intermittent engagement of the propeller with the water are compounded by increased power output of the engine.

Although many components of marine drives have been provided with design improvements, cone-clutch gear sets have yet to be addressed, and are a common weak link of marine drives. Generally, the weakness in cone-clutch drives is in one specific area, the roots at the toe of the teeth in the straight-cut bevel gear. Given the taper of teeth in straight-cut bevel gears, the toe of the gear tooth has a smaller cross-sectional area and exterior surface area, which, in part, leads to higher stress concentrations relative to the other portions of the tooth. Higher stress at the toe of the tooth is also due in part from higher loads applied to the toe of the tooth due to the distribution of a constant torque.

Manufacturability is a constraint on the development of cone-clutch gear sets. OEM marine drive gear and pinion sets are typically manufactured using near net forging. Although near net forging is a cost-effective way of gear production and results in relatively high-strength grain structures, it is not without drawbacks. For example, near net forging results in relatively rough surface finishes with poor tolerances, which in turn reduces rolling contact surfaces and increases friction between meshing gear faces. Further, near net forging may result in surface blemishes, which act as stress risers when the teeth are subjected to a load. The additional tangential force and stress risers can cause micro-fractures along the surface of the tooth which leads to pitting fatigue on the contact surface. Also, the gear is formed by friction welding a net forged gear portion with a hub portion. As a result, the unsupported teeth generally exhibit evidence of fatigue at the toes of each of the individual teeth are repeatedly subjected to stresses beyond their design specifications.

SUMMARY

It is therefore an object of the present disclosure to provide a gear unit that can sustain intermittent stress and avoid the failure.

The present disclosure meets these objects by providing a gear unit reduces stress concentration at the toe of the gear unit and reduces the failure of gear unit at an interface between a hub and a gear of the gear unit.

According to an aspect a gear unit is provided. The gear unit includes a gear having a gear face and a plurality of gear teeth extending outwardly from the gear face. The gear unit also includes a hub integrally formed with the gear and arranged coaxially to the gear. The hub extends outwardly of the gear in a direction of a central axis of the gear. The gear unit also includes an undercut defined at an interface of the gear and the hub and includes a curved portion arranged at proximate to an inner end of the gear. The undercut reduces a stress concentration at the interface of the gear and the hub and provides larger fillet radii than alternative designs.

In an embodiment, the undercut further includes a straight portion extending from the curved portion to an end of the hub.

According to one embodiment, the straight portion extends tangentially to the curved portion.

In one embodiment, the curved portion includes a radius between the toe end of the gear and hub portion containing the cone clutch surface.

In one embodiment, the radius varies between 0.35/diametral pitch of the gear and 0.65/diametral pitch of the gear.

In an embodiment, the gear is a bevel gear and the plurality of gear teeth extends obliquely relative to the central axis of the gear.

According to one embodiment, the hub includes an inner surface defining an elongated bore, wherein the inner surface tapers inwardly from a free end of the hub towards the gear.

In one embodiment, the gear unit is made of an alloy steel.

According to an embodiment, the gear unit is made of E9310 steel as per AMS 6265.

In one embodiment, the gear unit further includes an annular lip arranged at the interface of the hub and the gear and extending radially inwardly towards the central axis.

According to an embodiment, each of the plurality of gear teeth is a straight cut bevel gear tooth.

According to an aspect a gear unit is provided. The gear unit includes a gear face and a plurality of gear teeth extending outwardly from the gear face. The gear unit also includes a hub integrally formed with the gear and arranged coaxially to the gear. The hub extends outwardly of the gear in a direction of a central axis of the gear. The gear unit further includes an undercut defined at an interface of the gear and the hub. The undercut includes a curved portion arranged proximate to an inner end of the gear and a straight portion extending from the curved portion to an end of the hub. The undercut reduces a stress concentration at the interface of the gear and the hub.

In an embodiment, the straight portion tapers outwardly from the curved portion to the end of the hub.

According to an embodiment, the straight portion extends tangentially to the curved portion.

In some embodiments, the curved portion includes a radius between the toe end of the gear and hub portion containing the cone clutch surface.

In one embodiment, the radius varies between 0.35/diametral pitch of the gear and 0.65/diametral pitch of the gear.

In an embodiment, the gear is a bevel gear and the plurality of gear teeth extends obliquely relative to the central axis of the gear.

According to an embodiment, the hub includes an inner surface defining an elongated bore. The inner surface tapers inwardly from a free end of the hub towards the gear.

In one embodiment, the gear unit is made of E9310 steel as per AMS 6265.

In one embodiment, the gear unit further includes an annular lip arranged at the interface of the hub and the gear and extending radially inwardly towards the central axis.

According to an embodiment, each of the plurality of gear teeth is a straight cut bevel gear tooth.

These and other objects, features and advantages of the present disclosure will become apparent from a review of the following drawings and detailed description of the preferred embodiments of the disclosure.

BRIEF DESCRIPTION OF THE DRAWINGS

The present disclosure can best be understood in connection with the accompanying drawings. It is noted that the disclosure is not limited to the precise embodiments shown in the drawings, in which.

DETAILED DESCRIPTION OF THE DISCLOSURE

Figure 1:
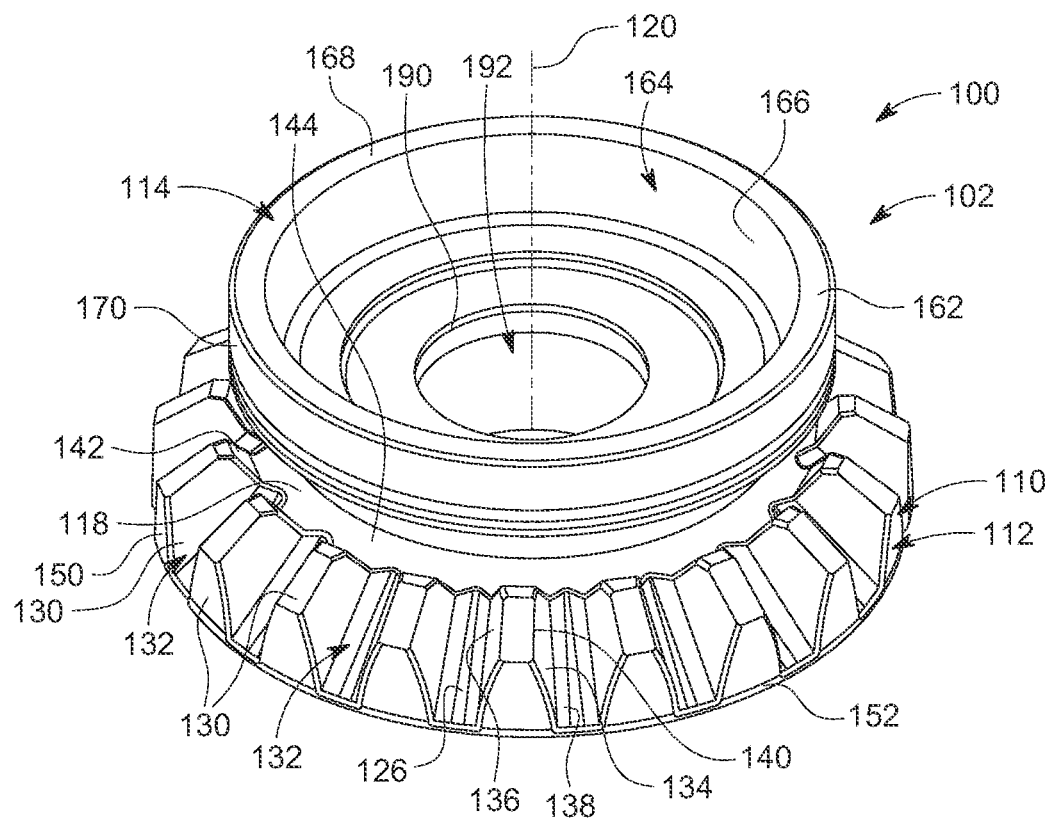
FIG. 1 illustrates a top perspective view of a gear unit, according to an embodiment of the disclosure.

For purposes of promoting an understanding of the principles of the disclosure, reference will now be made to the embodiments illustrated in the drawings and specific language will be used to describe the same. It will nevertheless be understood that no limitation of the scope of the disclosure is thereby intended. The disclosure includes any alterations and further modifications in the illustrated devices and described methods and further applications of the principles of the disclosure that would normally occur to one skilled in the art to which the disclosure relates.

One presently preferred embodiment of the disclosure comprises a gear unit having gear, for example, a bevel gear, and a hub integrally formed with the gear. As the gear and the hub are integrally formed, a failure of the gear unit at the interface of the hub and the gear is significantly reduced. Further, the gear unit includes or defines an undercut at the interface of the hub and the gear. The undercut includes a curved portion to decrease a stress concentration at the interface relative to a situation wherein the hub and the gear defines a sudden change in dimension and the contact between the gear and the hub is a line contact. Further, the undercut supports the toe of the gear, thereby increasing strength of the gear unit.

In the example shown in FIGS. 1-5, a gear unit 100 configured as a straight-cut bevel gear unit 102 is shown. The gear unit 100, in some embodiments, is used in cone-clutch gear assemblies of drive mechanisms for marine engines. In an embodiment, the gear unit 100 engages with a cone-clutch to transfer rotational power from an output shaft of marine engine to a propeller. However, those skilled in the art will appreciate that the concept of the instant disclosure may be applied to other types of gears, such as spur gears, spiral bevel gears, worm gears, hypoid gears, and helical gears, for example. Further, the benefits of this disclosure are not limited to marine applications and may be realized in any application incorporating one or more of the aforementioned gear types, such as automotive applications, industrial applications, medical applications, and agricultural applications, for example.

Figure 2:
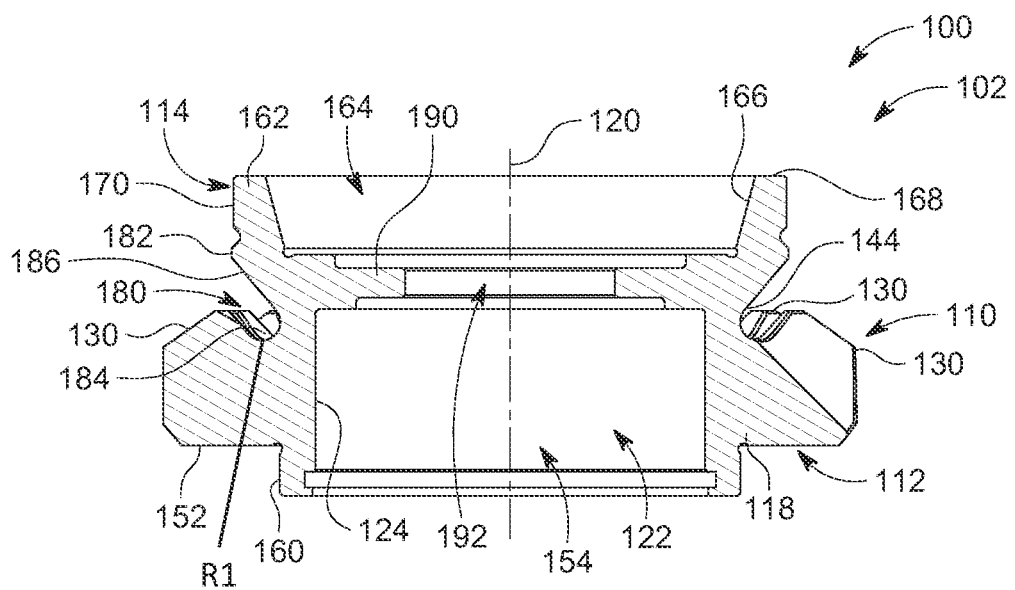
FIG. 2 illustrates a sectional view of the gear unit, according to an embodiment of the disclosure.

As shown in FIGS. 1 and 2, the gear unit 100 includes a gear 110, for example, a bevel gear 112, and a hub 114 integrally formed with the gear 110 and extending outwardly in a longitudinal direction from the gear 110. The hub 114 is adapted to engage with a cone-clutch (not shown) and is arranged co-axially with the gear 110. The gear 110 includes an annular body 118 defining a central longitudinal axis 120 of the gear 110 and an aperture 122 formed about the axis 120 of the gear 110. In some embodiments, the aperture 122 extends through the body 118. As shown, the body 118 includes an inner surface 124 (best shown in FIG. 2) having a substantially cylindrical structure, and a gear face 126 or an outer surface 126 (best shown in FIG. 1) having a substantially frustoconical shape. Accordingly, the aperture 122 includes a substantially cylindrical shape. Further, the gear 110 includes a plurality of gear teeth 130 extending outwardly from the outer surface 126 of the body 118 and is arranged at an oblique angle relative to the axis 120 of the gear 110. Accordingly, the gear 110 is a straight cut external bevel gear. The plurality of gear teeth 130 is circularly arrayed around the central axis 120 and are arranged spaced apart from each other. In this manner, a gap 132 is defined between two adjacently arranged teeth 130. The gaps 132 are adapted to receive the teeth of an engaging gear, for example, a pinion of the cone clutch assembly.

As is generally known in the art, each gear tooth 130 includes a pair of opposing sidewalls 134, 136 extending radially outwardly from the outer surface 126 of the body 118, and hence relative to the central axis 120. As shown, each gear tooth 130 includes a root 138 at the base of the sidewalls 134, 136, and a crown 140 connecting top ends of the sidewalls 134, 136, opposite the root 138. Each gear tooth 24 also includes a toe 142 arranged proximate to at an inner end 144 of the gear 110 and connecting first longitudinal ends of the sidewalls 134, 136, and a heel 150 arranged proximate to an outer end 152 of the gear 110 and connecting second longitudinal ends of the sidewalls 134, 136. Accordingly, the heel 150 of each gear tooth 130 is arranged at the base or proximate to the base of the frustoconical body 118, while the toe 142 is disposed distally from the base of the body 118 and proximate to an apex of the body 118.

Figure 3:
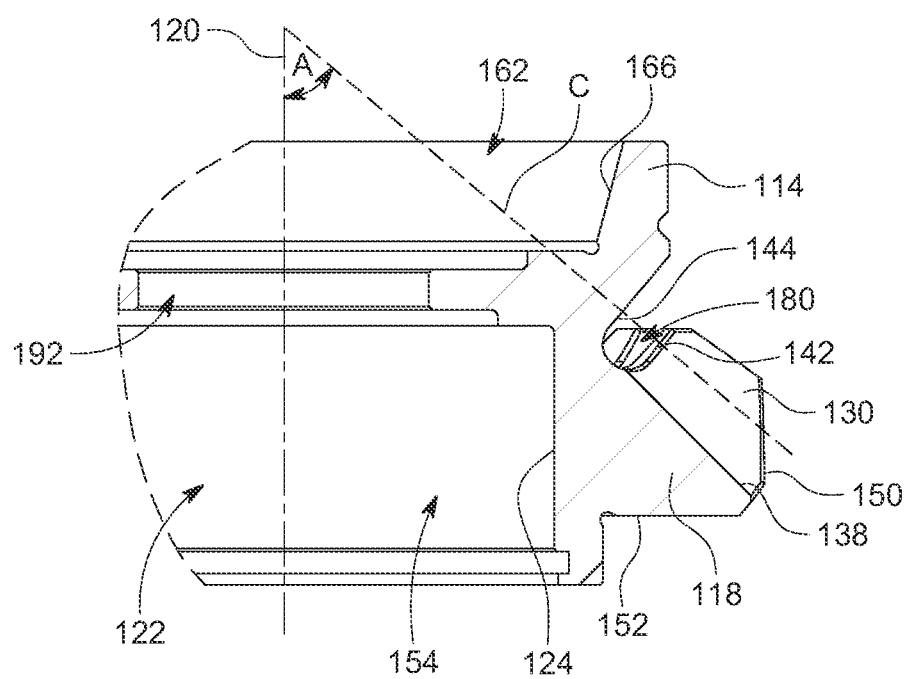
FIG. 3 illustrates a sectional view of the gear unit, according to an embodiment of the disclosure.

As shown in FIG. 3, the particular dimensions selected for the gear face 126 or the outer surface 126 and the gear teeth 130 define a theoretical pitch cone C of the gear 110. The pitch cone C represents an imaginary cone of the gear 110 that rolls without slipping on an opposing pitch surface of a meshing gear, as is understood in the art. An angle between the pitch cone C and the central axis 120 represents a pitch angle 'A' of the gear 110. Those skilled in the art of gear design will appreciate the various dimensional aspects of bevel gears. Therefore, these particular features are merely introduced here for reference, and will not be described in further detail.

Referring again to FIGS. 1 and 2, the aperture 122 of the body 118 may be a through-bore 154 extending from the outer end 152 of the gear 110 to the inner end 144. The hub 114 is connected to inner end 144 and extends outwardly and away from the gear 110 in a direction substantially parallel to the central axis 120. The gear 110 further includes an annular boss 160 circumscribing the aperture 122 and extending axially away from a perimeter of the inner surface 124 in an opposite direction from the hub 114. The boss 160 is configured to cooperate with a radial bearing to facilitate rotation of the gear unit 100 when the gear unit 100 is incorporated into a cone clutch assembly. However, those skilled in the art will appreciate that the boss 160 may be removed or replaced with other means or structure as needed for a particular application for cooperating with the bearing or other component, such as grooves or protuberances.

As shown, the hub 114 comprises a hollow body 162 defining an elongated bore 164 formed about the central axis 120. An inner surface 166 of the hub 114 is tapered inwardly from a free end 168 of the body 162 towards the gear 110. Accordingly, an inner diameter of the hub 114 (i.e., the body 162) decreases progressively in as a distance from the free end 168 increases. Therefore, the elongated bore 164 and hence the inner surface 166 is conical and forms an internal conical-clutch engagement surface. The inner surface 166 of the hub 14 is adapted to frictionally engage with an external conical surface of the cone clutch to enable a transfer of power and torque from the gear unit 100 to the propeller when the cone clutch is engaged with the gear unit 100. Further, the hub 114 includes an external surface 170 arranged opposite to the inner surface 166 and includes a substantially cylindrical shape.

Further, to reduce the stress concentration at the interface of the hub 114 and the gear 110, and support the toe 142 of each gear tooth 130, gear unit 100 includes an undercut 180 defined at the interface of the hub 114 and the gear 110. The undercut 180 extends from the inner end 144 of gear 110 to a second end 182 of the hub 114 arranged opposite to the free end 168. As shown, the undercut 180 includes a curved portion 184 and a straight portion 186. The curved portion 184 is arranged at the base of the gear teeth 130 and extends into of the body 118, while the straight portion 186 extends from the curved portion 184 to the second end 182 of the hub 114. As shown, the straight portion 186 is arranged substantially tangentially to the curved portion 184 and tapers outwardly from the inner end 144 of the gear 110 to the second end 182 of the hub 114. The undercut 180 decreases stress concentration by elimination sharp or sudden change in geometry at the interface of the hub 114 with the gear 110. In an embodiment, a radius 'R1' of the curved portion 184 varies between 0.35/DP (diametral pitch) of the gear and 0.65/DP of the gear. Also, the undercut 180 extends circularly around the central axis 120. Due to the presence of the undercut 180, a gap is defined between the toe end of the gear 110 and the outer surface of the hub 114, and thereby enables a flexing of the gear teeth 130 under loading, facilitating a uniform stress distribution at the interface of the gear 110 and the hub 114. Accordingly, the undercut 180 (i.e., the curved portion 184) reduces the failure of the gear unit 100.

Moreover, the gear unit 100 includes an annular lip 190 arranged at an interface of the hub 114 and gear 110 and extending radially inwardly towards the central axis 120 from inner surfaces 124, 166 of the hub 114 and the gear 110. Accordingly, the lip 190 is arranged between second end 182 of the hub 114 and inner end 144 of the gear 110, and extends circularly around the central axis 120, and defines a circular opening 192 that connects the aperture 122 of the gear 110 with the elongated bore 164 of the hub 114. The annular lip 190 provides extra strength to the gear unit 100 at the interface of the gear 110 and hub 114.

Figure 4:
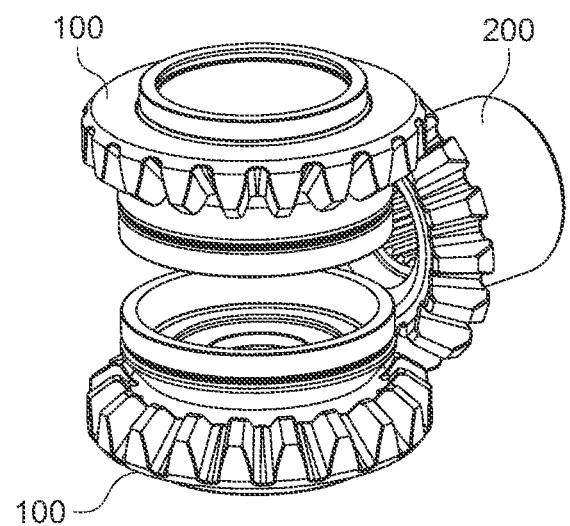
FIG. 4 illustrates gear units engaged with a pinon of a drive unit, according to an embodiment of the disclosure.
Figure 5:
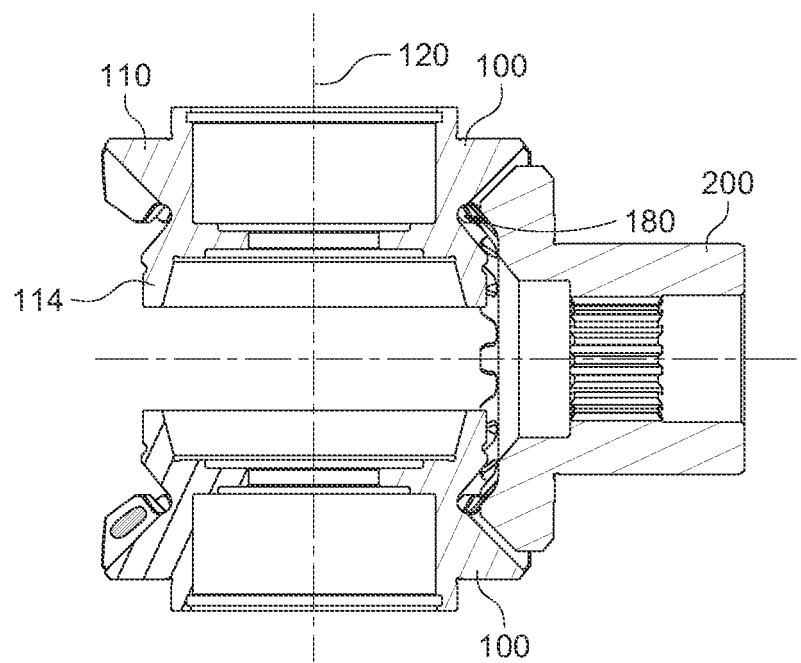
FIG. 5 illustrates sectional view of the drive unit of FIG. 4, according to an embodiment of the disclosure.

Referring to FIGS. 4 and 5, an arrangement of two gear units 100 engaged with a pinion 200 inside a cone clutch assembly is shown. It may be appreciated that the cone clutch is arranged between the two gear units 100 and is mounted on a shaft that provides power to the propeller. The cone clutch is engaged with the one of the gear units 100 to rotate the propeller in a first direction and is engaged with another of the gear units 100 to rotate the propelled in a second direction opposite to the first direction.

A method of manufacturing the gear unit 100 is explained now. The method includes providing a billet of suitable material for manufacturing the gear unit 100. In some embodiments, the billet is made of alloy steel. In an embodiment, the billet is of E9310 steel as per AMS 6265. It may be appreciated that the steel is produced in a vacuum for highest level of purity. Thereafter, a gear unit blank is prepared by precision machining the billet on a straight cut bevel gear manufacturing machine. Subsequently, the gear unit blank is carburized, and case hardened by a vacuum heat treatment process. In an embodiment, a case depth hardness of 45RC to 62RC is obtained by the case hardening process. Further, the dual shot peening of the gear teeth of the gear unit blank is performed. Moreover, an isotropic polishing of gear tooth faces is performed. This process further hardens the gear teeth 130 to reduce the chance of pitting.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed disclosure.

What is claimed is:

1. A gear unit, comprising:
a gear having a gear face and a plurality of gear teeth extending outwardly from the gear face;
a hub integrally formed with the gear and arranged coaxially to the gear, the hub extends outwardly in a direction of a central axis of the gear; and
an undercut defined at an interface of the gear and the hub and including a curved portion arranged proximate to an inner end of the gear, wherein the undercut reduces a stress concentration at the interface of the gear and the hub, and wherein the curved portion includes a radius between 0.35/diametral pitch of the gear and 0.65/diametral pitch of the gear.

2. The gear unit of claim 1, wherein the undercut further includes a straight portion extending from the curved portion to an end of the hub.

3. The gear unit of claim 2, wherein the straight portion tapers outwardly from the curved portion to the end of the hub.

4. The gear unit of claim 3, wherein the straight portion extends tangentially to the curved portion.

5. The gear unit of claim 1, wherein the gear is a bevel gear and the plurality of gear teeth extends obliquely relative to the central axis of the gear.

6. The gear unit of claim 1, wherein the hub includes an inner surface defining an elongated bore, wherein the inner surface tapers inwardly from a free end of the hub towards the gear.

7. The gear unit of claim 1, wherein the gear unit is made of an alloy steel.

8. The gear unit of claim 1, wherein the gear unit is made of E9310 steel as per AMS 6265.

9. The gear unit of claim 1 further including an annular lip arranged at the interface of the hub and the gear and extending radially inwardly towards the central axis.

10. The gear unit of claim 1, wherein each of the plurality of gear teeth is a straight cut bevel gear tooth.

11. A gear unit, comprising:
a gear having a gear face and a plurality of gear teeth extending outwardly from the gear face;
a hub integrally formed with the gear and arranged coaxially to the gear, the hub extends outwardly on the gear in a direction of a central axis of the gear; and
an undercut defined at an interface of the gear and the hub and including a curved portion arranged disposed proximate to an inner end of the gear, and a straight portion extending from the curved portion to an end of the hub, wherein the undercut reduces a stress concentration at the interface of the gear and the hub, and wherein the curved portion includes a radius between 0.35/diametral pitch of the gear and 0.65/diametral pitch of the gear.

12. The gear unit of claim 11, wherein the straight portion tapers outwardly from the curved portion to the end of the hub.

13. The gear unit of claim 11, wherein the straight portion extends tangentially to the curved portion.

14. The gear unit of claim 11, wherein the gear is a bevel gear and the plurality of gear teeth extends obliquely relative to the central axis of the gear.

15. The gear unit of claim 11, wherein the hub includes an inner surface defining an elongated bore, wherein the inner surface tapers inwardly from a free end of the hub towards the gear.

16. The gear unit of claim 11, wherein the gear unit is made of E9310 steel as per AMS 6265.

17. The gear unit of claim 11 further including an annular lip arranged at the interface of the hub and the gear extending radially inwardly towards the central axis.

18. The gear unit of claim 11, wherein each of the plurality of gear teeth is a straight cut bevel gear tooth.

* * * * *